United States Patent [19]

Knudson

[11] 4,130,091

[45] Dec. 19, 1978

[54] ANIMAL WALKER

[76] Inventor: M. Theresa Knudson, 3900 16th St. NW., Washington, D.C. 20011

[21] Appl. No.: 753,891

[22] Filed: Dec. 23, 1976

[51] Int. Cl.² ............................................. A61D 3/00
[52] U.S. Cl. .................................................. 119/102
[58] Field of Search ...................... 119/102, 100, 29, 1; 272/33, 70.3; 128/25; 5/81 R, 81 B, 87, 10

[56] References Cited

U.S. PATENT DOCUMENTS

| | | | |
|---|---|---|---|
| 216,129 | 6/1879 | Arless | 119/102 |
| 487,190 | 11/1892 | Martin | 119/100 |
| 560,145 | 5/1896 | McGehee | 119/102 X |
| 2,871,915 | 2/1959 | Hogan | 119/29 X |
| 2,976,840 | 3/1961 | Hugus | 119/1 |
| 3,113,340 | 12/1963 | Bush et al. | 119/100 X |
| 3,621,819 | 11/1971 | Hooper | 119/102 |

Primary Examiner—Hugh R. Chamblee
Attorney, Agent, or Firm—Leitner, Palan, Martin & Bernstein

[57] ABSTRACT

This invention essentially consists of a padded blanket surrounding an animal, to which are attached lifting and controlling devices. Lift and some control are provided by ropes on an axle which is turned by a wheel sufficiently large to provide the desired mechanical advantage, or pulleys attached to a fixed beam above the pulleys. Further control is achieved by ropes or straps originating on both sides of the blanket and attached at their distal ends to the vertical supporting structure on each side. The supporting structure consists of a pair of tracks fastened to the ground enclosing wheels on which the vertical supporting structures roll, similar wheels in similar inverted tracks at the top of the vertical structures, vertical track supports spaced periodically along the tracks connecting upper and lower tracks, horizontal track supports spaced periodically along the tracks holding the upper tracks at points equidistant from each other, and a bumper surrounding the supporting structure just below the upper wheels.

8 Claims, 7 Drawing Figures

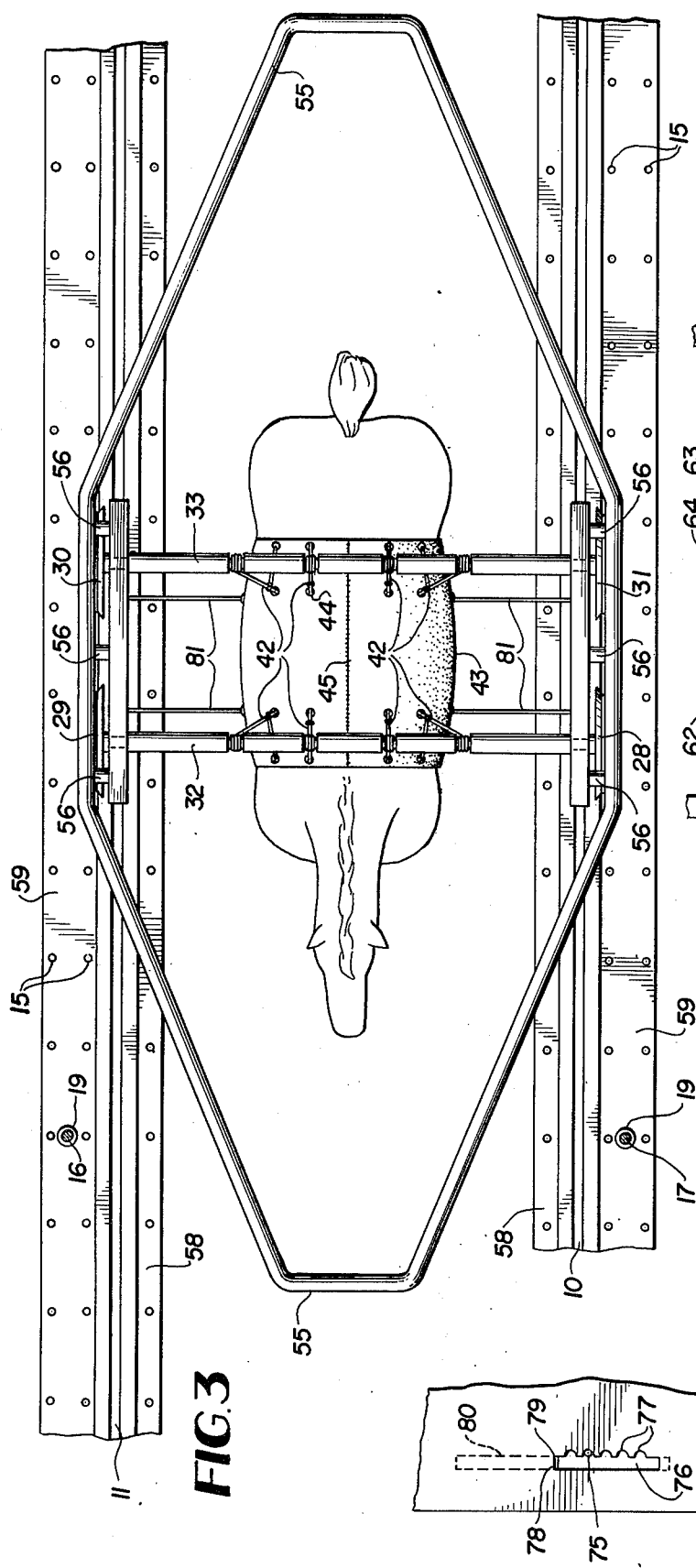
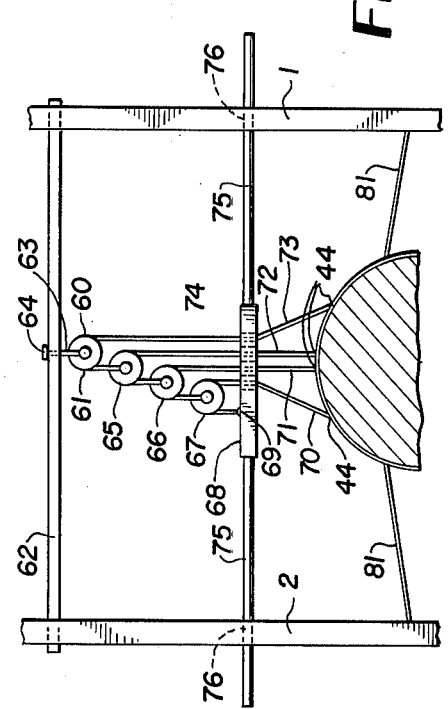

ANIMAL WALKER

SUMMARY OF THE INVENTION

The present invention is designed for aiding the cure or treatment of adaptable animals such as horses or cows with broken legs, bone disorders, torn or damaged muscles or other tissue, infections, sore or injured hooves or feet, temporary partial paralysis, or any condition or illness in which the animal may benefit from help in gradually getting back on his feet. It would be advisable, if not necessary, to train prospective users of this invention to accept it befor they need to use it. For example, a horse might be trained to accept the invention when he has learned to accept a saddle or harness.

One object of the present invention is to support and control a horse or other adaptable animal for any necessary period of time from minutes to months. The support for up to half or more of the animal's weight combined with a control of the animals's movement is designed to be especially helpful in allowing a severely broken leg to heal. Weight is taken off the injured leg. It is put in a cast. The control, as described later, keeps the animal from being able to jar the set leg by scraping or pounding it against something in an effort to rid himself of the foreign object. The present invention also makes it impossible for the animal to trip and fall, further injuring himself as he might otherwise do while attempting to walk or move at a faster pace in an unaccustomed fashion with just a cast and/or brace on his leg. The walker of the present invention supports the weight which would ordinarily be supported by the injured leg and thereby prevents this additional weight from being shifted to the good legs.

Another object of the present invention is to make possible a milder form of exercise than would otherwise be possible. Such exercise may be of help in the sudden transition from a very active life to convalescing.

A further object of the present invention is to make constant human attendance unnecessary while walking, except in cases of partial paralysis or other disorder causing the animal to require someone to lead him while walking. If desired, the animal can move in and out of doors at will by means of the bumper which precedes him and pushes open swinging doors. An oval shaped track would be especially suited to this purpose.

Another objec ot the invention is to provide as healthful and comfortable an environment as possible for the animal, both psychologically and physically, while convalescing. To this end, his frontal vision is left unobstructed, thereby avoiding a sense of enclosure and the invention is made as comfortable as possible with cushioned support and control in such manner as to provide a maximum sense of freedom.

BRIEF DESCRIPTION OF DRAWING

FIG. 3 is a top view of the wheel and axle version of the invention with a horse supported thereby.

FIG. 6 is an alternate design of the invention showing how pulleys can be used in place of the wheel and axle lift.

FIG. 7 is a partial view of the outside of wall 1 (identical to wall 2) when the pulley system is used.

DETAILED DESCRIPTION

The specific details drawn and described herewith are for illustrative purposes in explaining this invention and are not intended to limit the scope of the invention. A variety of modifications, alterations, or further applications of the invention may occur to one skilled in the art to which the invention relates without altering the scope or basic principles of the invention. One such alteration is illustrated in FIG. 6.

Figure 1:
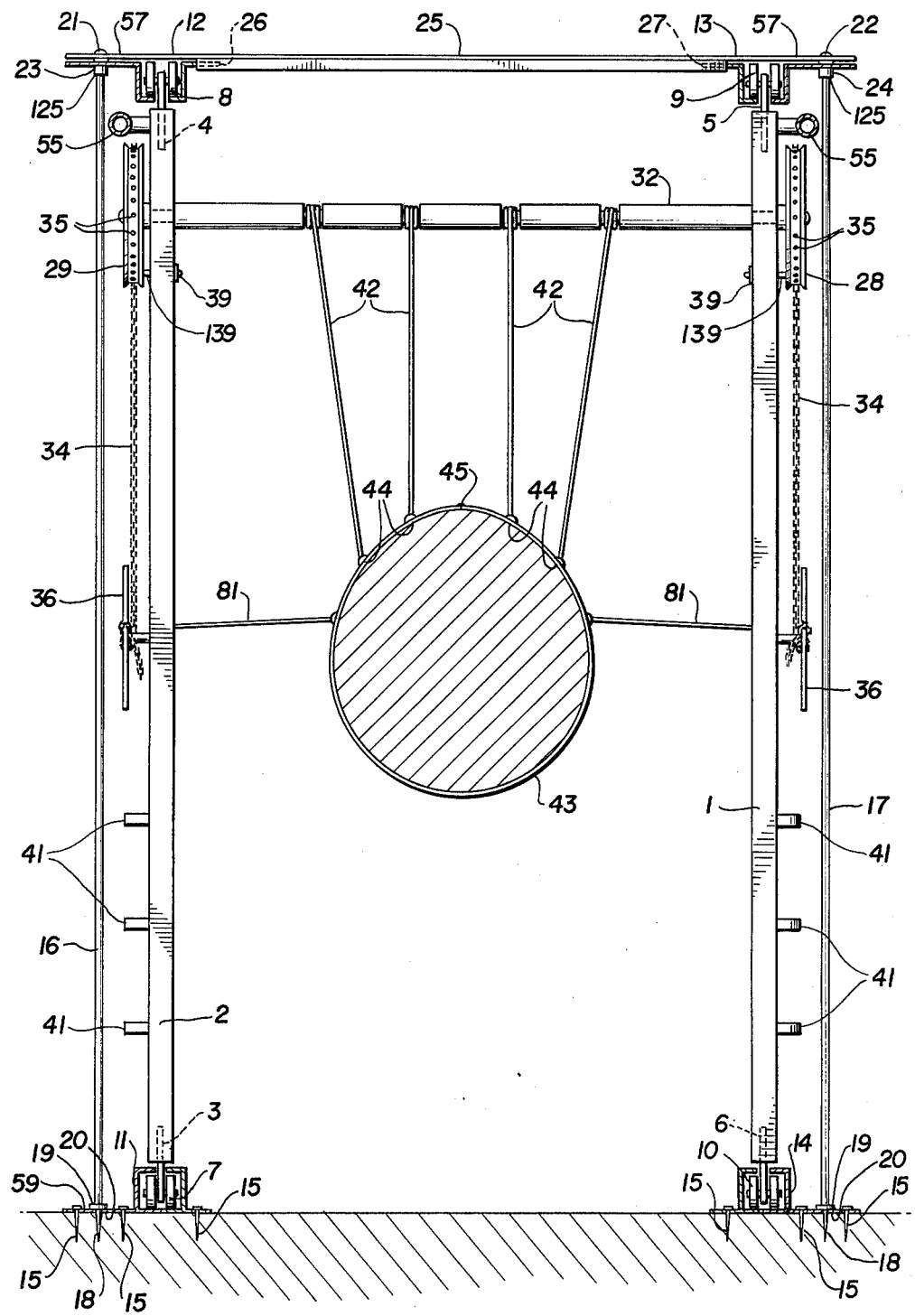
FIG. 1 is a front view in cross-section of the invention using the wheel and axle lift.

Referring now more particularly to FIG. 1, the support system is composed of two walls 1 and 2 in which connecting rods 3, 4, 5, and 6 join the walls 1 and 2 to the double wheels 7, 8, 9, and 10, each of which is enclosed in a track 11, 12, 13, and 14 which follows the contours of the wheels.

The lower tracks 11 and 14 are fastened to the ground with spikes 15. Vertical track supports 16 and 17 are poles which have spikes 18 surrounded by nuts 19 which fasten by application of torque at their proximal ends where they begin tapering from the poles and enter the ground through the track flange 59 at apertures 20 to fasten into the ground at their distal ends. The heads 21 and 22 of vertical track supports 16 and 17 join supports 16 and 17 to tracks 12 and 13 as the supports pass through apertures 23 and 24 in track flanges 57. Nuts 125, like their counterparts 19, require application of torque to fasten vertical supports 16 and 17 to the track flanges 57 at apertures 23 and 24.

The horizontal track support 25 is a pole which is hollow at both ends leaving just enough space to admit flanges 26 and 27 from tracks 12 and 13. Upper tracks 12 and 13 are inverted versions of lower tracks 11 and 14 differing only in the horizontal flanges extending at right angles from both sides of the upper and lower tracks. Further description of these differences is presented later with FIG. 3 and FIG. 5. The vertical track supports help to hold the upper tracks in place and the horizontal track supports keep the upper tracks equidistant at all points. Vertical and horizontal track supports are placed together at regular intervals along the track which can be any desired shape. An oval track would enable the animal to walk around in a continuous path.

Figure 2:
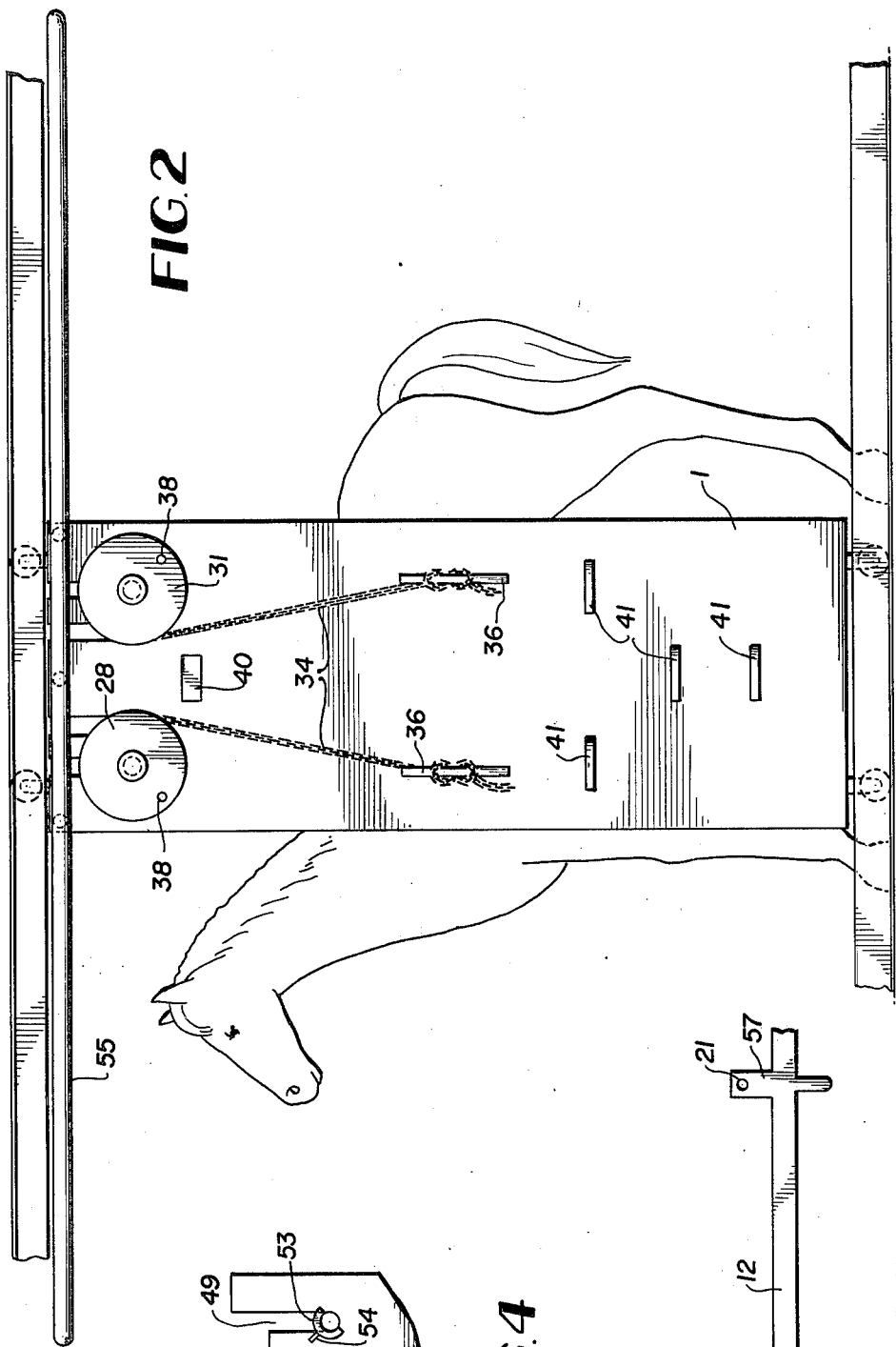
FIG. 2 is a side view of the wheel and axle version of the invention with a horse supported thereby.

Shown in FIG. 3, one method of providing lift to support part of the animal's weight is the use of relatively large wheels 28, 29, 30, and 31 turning axles 32 and 33. Size of the wheels depends on the desired amount of mechanical advantage. In FIG. 1 it is seen that wheels 28 and 29 (as well as 30 and 31 not pictured in FIG. 1) are indented leaving space for chains 34 to wind around said wheels on spikes 35. In FIGS. 2 and 3 it is shown that a downward pull of chains 34 will turn wheels 28 and 29 clockwise and wheels 30 and 31 counterclockwise causing axles 32 and 33 to turn in the same direction as their wheels which can be operated on one or both sides of the animal. Turning of wheels 28, 29, 30 and 31 causes the ropes 42 to wind around axles 32 and 33 thereby lifting the blanket 43 surrounding the horse. Chains 34 are then secured by attaching to posts 36 extending from walls 1 and 2 at easy reaching distance from the ground. If the wheels are found to require further securing to retain the desired amount of lift, the operator can climb steps 41 on walls 1 and 2, as shown in FIGS. 1 and 2, take cotters from boxes 40 extending from walls 1 and 2, insert cotters 139 through apertures 38 as seen in FIG. 2, and fasten with nut 39 on the inside of walls 1 and 2 (see FIG. 1).

In FIG. 1 ropes 42 extending from axles 32 and 33 are attached at their distal ends to the outer blanket 43 through apertures 44. The outer blanket must be made of a material capable of withstanding the weight of the animal and can be reinforced with leather straps or other suitable material at points of stress. Inside the outer blanket a padding of spongy material, such as a three inch thickness of the firmest foam rubber would absorb shock, blend with the movement of the animal, and make the device more comfortable. Next to the animal would be an inner blanket made of a suitable material such as cotton. (Neither padding nor inner blanket is illustrated because they are merely necessary accessories used in operating the invention, but are not part of the invention).

In FIGS. 1 and 3 a zipper 45 runs the length of the outer blanket 43 along the top to facilitate opening and closing. The outer blanket 43 is slipped on and off by way of the head of the animal under this forefeet after providing sufficient slack in ropes 42.

Figure 4:
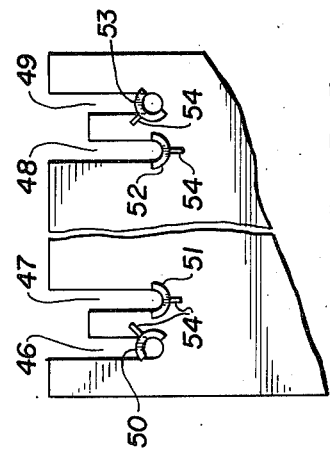
FIG. 4 is a partial view of the inside of wall 1 (identical to wall 2). when the wheel and axle system is used.

FIG. 4 shows how axles 32 and 33 can be adjusted to be closer or further apart depending on the length of the animal using them. Either slot 46 or 47 is used for axle 32, and slot 48 and 49 is used for axle 33. Space between the top of the wall and the upper track must be sufficient to allow axles 32 and 33 to move up the slot, along the top of the wall, and down into the desired slot. Sliding doors 50, 51, 52, and 53 keep the axles 32 and 33 firmly in place and open by sliding handles 54 from the outside wall. Sliding doors 50 and 53 are shown in closed position and sliding doors 51 and 52 are shown in open position.

FIG. 3 shows a top view of the invention without the top track so that the parts of the invention under the top track can be seen. The bumper 55 surrounds the area in which the animal walks. Bumper 55 is attached to walls 1 and 2 by flanges 56. The bumper 55 lends some support by helping to keep the walls in line, but its main function is to open swinging doors when moving either forward or backward, thus enabling the animal to walk into or out of the barn or other enclosure at will when the doors are not bolted.

Figure 5:
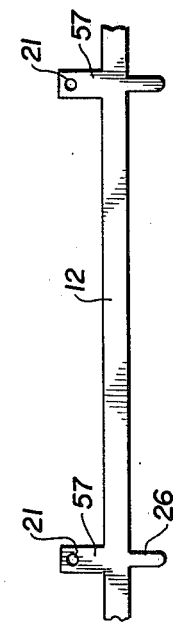
FIG. 5 is a top view of the upper right track.

FIG. 3 and FIG. 5 show differences between the supporting flanges of the upper tracks 12 and 13 and the lower tracks 10 and 11. In FIG. 3 the lower tracks 10 and 11 are shown with continuous flanges 58 and 59 fastened to the ground with spikes 15. FIG. 5 shows the top of the upper right track 12. Upper track 13 was not illustrated here because it is identical to track 12. Instead of continuous flanges adding weight to the upper track, the flanges 57 are spaced at the intervals where vertical track support 16 (see FIG. 1) meets flange 57 at head 21 and horizontal track support 25 meets track 12 at flange 26. As shown in FIG. 1 track 13 is set up in the same manner as track 12.

FIG. 6 shows an alternate design using a pulley block 60 in which pulley 61 is a fixed pulley attached to beam 62 by bolt 63 and nut 64. Beam 62 is attached in a fixed position to walls 1 and 2 at a height sufficient to allow movable pulleys 65, 66, and 67 to operate above the animal. Cords 70, 71, 72, and 73 go through apertures 74 in movable beam 68 and are attached to the outer blanket 43 through apertures 44 at their distal ends. At their proximal ends pulley cord 73 attaches pulley 61 to pulley 65; cord 72 attaches pulley 65 to pulley 66; cord 71 attaches pulley 66 to pulley 67; and cord 70 attaches pulley 67 to movable beam 68 at point 69. Rods 75 extend through apertures 76 in walls 1 and 2 and allow the pulley system to be operated from outside the walls 1 and 2 as illustrated in FIG. 7. Rod 75 is pulled downward through aperture 76 until the desired amount of lift has been achieved and is pushed into the nearest side slot 77. In FIG. 7 rod 75 is in the second slot 77 from the top. Then sliding door 78 is pulled back with handle 79 allowing bar 80 to fall into place locking rod 75 in place.

In FIG. 6 ropes 81 (shown also in FIGS. 1 and 3) extending from outer blanket 43 provide control by securing the animal to walls 1 and 2 thus preventing contact with any part of the invention to which the animal is attached. The animal walks alone or is led along the track.

The invention claimed is:

1. An animal walker comprising
   means for engaging the midsection of an animal,
   track means for controlling the path of the walker including a pair of upper rails separated by spaced horizontal struts,
   support means for supporting said track means,
   a carriage having a pair of opposed vertical elements on opposite sides of said engaging means, each including rollers at their tops and bottoms for slidably engaging said track means and the ground respectively and extending along the axis of said track means no greater than the length of the animal's midsection, and
   means connecting said engaging means to said carriage for restraining and supporting the animal in said carriage.

2. An animal walker according to claim 1 wherein said track means includes a pair of lower rails and said bottom rollers of said vertical elements slidably engage said lower rails.

3. An animal walker according to claim 2 wherein said track means include vertical struts supporting said top rails.

4. An animal walker according to claim 1 wherein said restraining means includes a pair of vertical restraints spaced along the axis of the track means for separately adjusting the height of opposite ends of said engaging means.

5. An animal walker according to claim 4 wherein said restraining means includes horizontal restraints to limit movement of said engaging means in the vertical and horizontal planes.

6. An animal walker according to claim 4 wherein each member of said pair of vertical restraints includes a plurality of vertical restraints.

7. An animal walker according to claim 1 wherein said engaging means includes a blanket surrounding the midsection of the animal.

8. An animal walker comprising
   means for engaging the midsection of an animal,
   track means for controlling the path of the walker,
   a carriage having a pair of opposed vertical elements on opposite sides of said engaging means slidably engaging said track means and extending along the axis of said track means no greater than the length of the animal's midsection,
   means connecting said engaging means to said carriage for restraining and supporting the animal in said carriage, and
   a bumper extending from the top of said carriage along the axis of said track means beyond the length of the animal.

* * * * *